US008407704B2

(12) United States Patent
Döring

(10) Patent No.: US 8,407,704 B2
(45) Date of Patent: Mar. 26, 2013

(54) MULTI-LEVEL MEMORY ARCHITECTURE USING DATA STRUCTURES FOR STORING ACCESS RIGHTS AND PERFORMING ADDRESS TRANSLATION

(75) Inventor: Andreas Christian Döring, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1621 days.

(21) Appl. No.: 11/535,261

(22) Filed: Sep. 26, 2006

(65) Prior Publication Data

US 2008/0077922 A1 Mar. 27, 2008

(51) Int. Cl.
*G06F 9/26* (2006.01)
*G06F 9/34* (2006.01)
*G06F 9/46* (2006.01)

(52) U.S. Cl. ......................................... 718/100; 711/206
(58) Field of Classification Search .......................... None
See application file for complete search history.

(56) References Cited

U.S. PATENT DOCUMENTS

| | | | | | |
|---|---|---|---|---|---|
| 5,845,129 | A * | 12/1998 | Wendorf et al. | ............... | 710/200 |
| 5,890,189 | A * | 3/1999 | Nozue et al. | ................... | 711/100 |
| 6,199,117 | B1 * | 3/2001 | Cox et al. | ....................... | 719/328 |
| 7,363,359 | B1 * | 4/2008 | Tripathy et al. | ............... | 709/223 |
| 7,370,174 | B2 * | 5/2008 | Arizpe et al. | .................. | 711/206 |
| 7,543,126 | B2 * | 6/2009 | Lewis | ............................ | 711/163 |
| 2002/0174265 | A1 * | 11/2002 | Schmidt | ......................... | 709/328 |
| 2006/0075071 | A1 * | 4/2006 | Gillette | .......................... | 709/219 |
| 2006/0259487 | A1 * | 11/2006 | Havens et al. | .................... | 707/9 |
| 2007/0016755 | A1 * | 1/2007 | Pratt | ............................. | 711/207 |

OTHER PUBLICATIONS

Koldinger, Chase, Eggers: "Architectural Support for Single Address Space Operating Systems", ASPLOS V, 1992.
Witchel, Cates, Asanovic: "Mondrian Memory Protection", ASPLOS-X, 2002.
Wiggins "A Survey on the Interaction Between Caching, Translation and Protection", Technical Report UNSW-CSE-TR-0321, University of New South Wales, School of Computer Science and Engineering, 2003.
Liedtke, J. "A High Resolution MMU for the Realization of Huge Finegrained Address Spaces and User Level Mapping", GMD Technical Report No. 791, 1993.
Liedtke, J. "Page Table Structures for Fine-Grain Virtual Memory", GMD Technical Report No. 872, 1994.

\* cited by examiner

*Primary Examiner* — Jennifer To
*Assistant Examiner* — Eric C Wai
(74) *Attorney, Agent, or Firm* — Eustus D. Nelson; Lily Neff

(57) ABSTRACT

The present invention provides a method and system for providing multi-level memory protection. The method includes defining a hierarchy of one or more parent process and their respective child processes. The method further includes building a data structure for defining access rights of each of the parent process and their respective child processes in the defined hierarchy.

21 Claims, 5 Drawing Sheets

MULTI-LEVEL MEMORY ARCHITECTURE USING DATA STRUCTURES FOR STORING ACCESS RIGHTS AND PERFORMING ADDRESS TRANSLATION

FIELD OF THE INVENTION

The present invention relates to the field of memory management. More particularly, the present invention relates to creating and maintaining a memory structure with multiple levels of access rights and protection.

BACKGROUND OF THE INVENTION

In a typical computing system, various kinds of memories are used such as CPU registers, Cache, Virtual Memory etc. Each memory has a characteristic cost and speed features. Also, the computing system requires fast access to the various kinds of memories. In one of the methods known in the art, a memory hierarchy is used to have relatively fast access to the various kinds of memories.

In a typical computing environment, one or more processes run in parallel to each other. During execution, these processes create one or more sub-processes which, in turn, may create further sub-processes. The main process is called a parent process and the sub-processes created by it are called child processes. If a child process creates sub-processes, it becomes a parent for the newly created sub-processes. Every parent and child process has predefined access rights. These access rights define the level of memory protection for example, read and write rights for the process, in various portions of a physical memory.

Usually, a root process that is usually the operating system, defines the access rights of a process (parent or child), thereby offering a single level of memory protection. Advanced software development and execution paradigms such as virtual machine, applets, plug-ins, and middleware have made it increasingly important to have various levels of protection for various kinds of processes that are running on the computing system.

Furthermore, in accordance with the existing memory management techniques, an exception is generated during run-time of a process whenever the process in execution violates the rights. It is desirable to have a system in place by which the rights of a process can be checked while it is being created.

In accordance with a known technique, 2.5 levels of memory protection have been implemented by having 1 level of address protection using the operating system, an additional level of protection by defining the range of memory address that a child process can read and/or write to and another sub-level of protection by defining a bit which determines if the process is allowed to execute code or not.

Prior art also has a provision for a bypass data structure for up to two levels of address translations.

For maximum flexibility and secure execution, it is desirable to have multiple levels of memory protection for a complete hierarchy of a parent process as well as its respective child processes. It is also desirable to have an additional data structure that implements direct address translation up to a customized level of hierarchy.

SUMMARY

The present invention meets these and other needs by providing a method and system for multi-level memory protection. The method includes defining a hierarchy of one or more parent processes and their respective child processes and building a data structure for defining access rights of each of the parent processes and their respective child processes in the defined hierarchy.

The present invention also provides a computer program product for multi-level memory protection implementation.

BRIEF DESCRIPTION OF DRAWINGS

The above and other items, features and advantages of the present invention will be better understood by reading the following description of the present invention in conjunction with the accompanying drawings, wherein.

DETAILED DESCRIPTION

The present invention provides a method and system for providing multi-level memory protection. The method builds a hierarchy of one or more parent processes and their respective child processes and builds a data structure for defining access rights of each of the parent processes and their respective child processes. This data structure, unlike a traditional system data structure, is spread over memory regions of variable ownership and access rights.

In a typical computing environment, one or more processes run in parallel with each other. During execution, these processes create one or more sub-processes which, in turn, may create further sub-processes. The main process is called a parent process and the sub-processes created by it are called child processes. If a child process creates sub-processes, it becomes a parent for the newly created sub-processes. Every parent and child process has predefined access rights. These access rights define the level of memory protection for example, read and write rights for the process, in various memory regions for the corresponding process.

Figure 1:
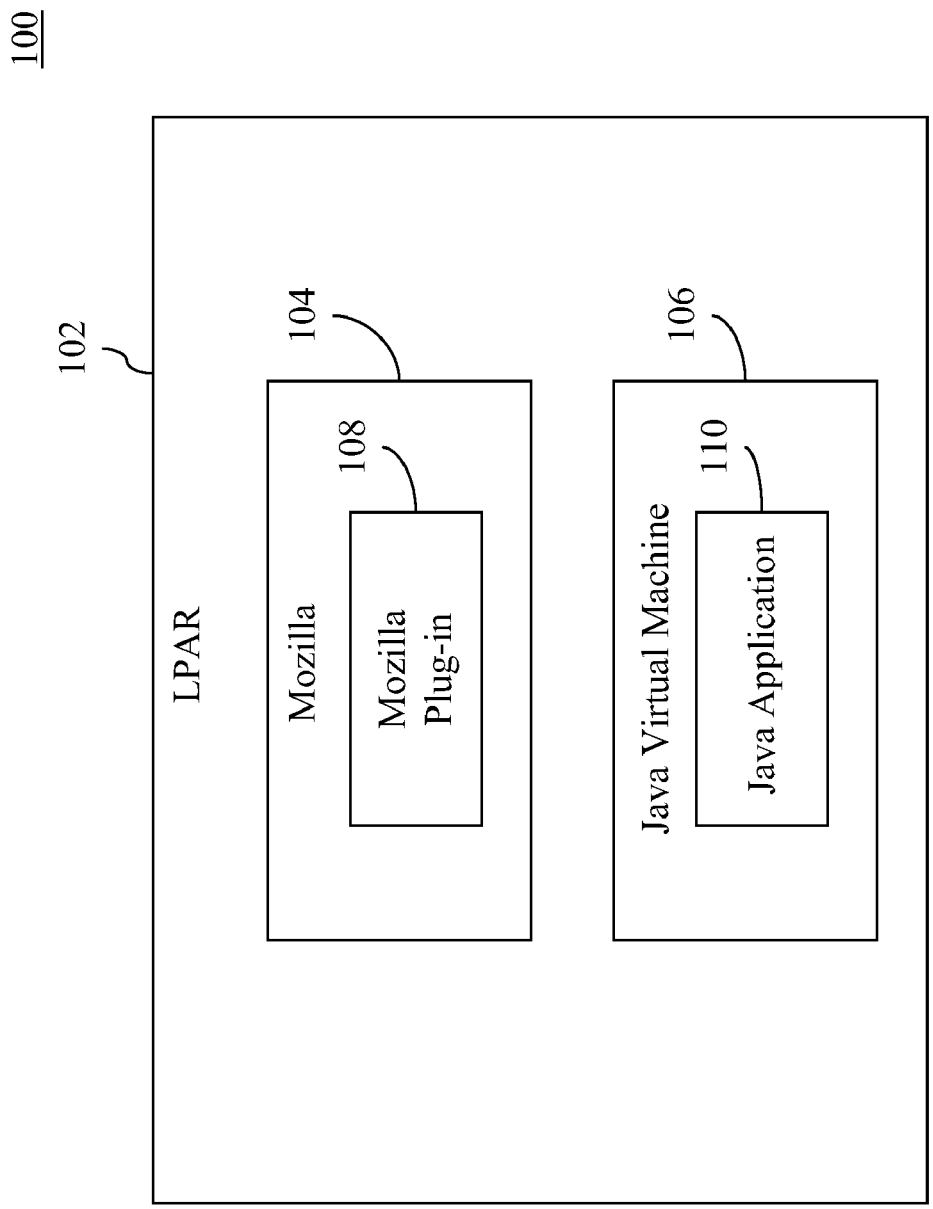
FIG. 1 shows an environment for providing multi-level memory protection, in accordance with an embodiment of the present invention.

FIG. 1 shows an environment 100 for providing multi-level memory protection, in accordance with an embodiment of the present invention. The environment 100 depicts a hierarchy of processes, including one or more parent process and its respective child process(s), generated for the multi-level memory protection. In accordance with an embodiment, program modules are called processes and are executed by a processor. The parent process has more comprehensive access rights, while the child process inherits its access rights from the parent process.

For example, as shown in FIG. 1, operating system LPAR (Logical Partitioning for Mainframes) 102 is a parent process that contains child processes Mozilla Application 104 and Java Virtual machine 106. LPAR 102 is a virtualized computing environment abstracted from all physical devices. However, Mozilla Application 104 itself acts as a parent process to a Mozilla Plug-in 108 while Mozilla Plug-in 108 becomes the child process. It may be seen from the diagram that Mozilla plug-in 108 acts only as a child process while Mozilla Application 104 acts both as a parent process and a child process. Similarly, a Java Virtual Machine (JVM) 106 acts as a parent process to a Java Application 110. The example thus illustrates that if the child process includes one or more sub-processes, then the child process is considered a parent process for its sub-processes. The sub-processes are called the child process of the newly created parent process.

Each process (including parent and child process) is associated with a unique process identifier. The processor has a register which holds the process identifier of the current process. The current process is the process for which the instruction is being executed. The process identifier consists of a fixed number of bits. This number of bits, in accordance with an embodiment, may be sufficiently large (for example, 96 bits) to minimize software effort in determining a new identifier when a new process is created. In accordance with an embodiment, the process identifier may be generated based on prefix allocation. In prefix allocation, the process identifier of all the processes includes two parts, where initially, the second part comprises all zeros. When a parent process creates a new child process, it uses its own process identifier and appends some bits which are not all zero, thereby shortening the second half.

Figure 2:
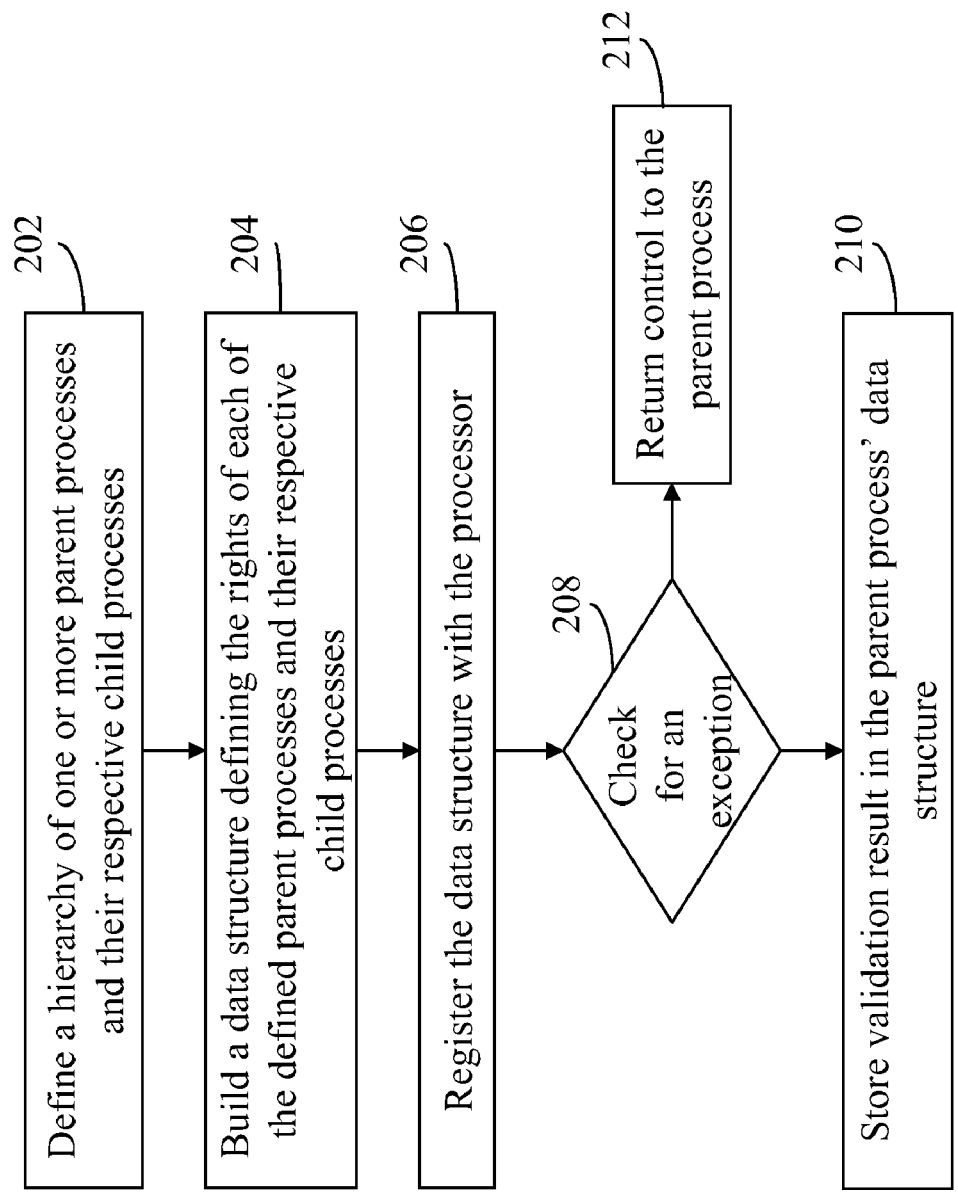
FIG. 2 is a flowchart describing a method for providing multi-level memory protection, in accordance with an embodiment of the present invention.

FIG. 2 is a flowchart describing a method for providing multi-level memory protection, in accordance with an embodiment of the present invention. To implement the multi-level memory protection, at step 202, a hierarchy of one or more parent processes and their respective child process(es) is defined. Thereafter, at step 204, a data structure defining the access rights of each of the parent processes and their respective child processes in the defined hierarchy is built. In one embodiment of the present invention, the data structure is a combination of a table and a tree. The data structure comprises a memory address range allocated to each parent process and its respective child process. Further, the data structure comprises a memory address range for each of the child process to return to their respective parent processes. In an embodiment of the present invention, the data structure of the parent process includes, but not limited to, a process ID of the child process, address translation rules, a list of exceptional or temporal or final exit address and links for permission structures of at least one child process created by the child process itself. These links for the permission structure created by the child process indicate the link to the process ID of another child process for whom the previous child process acts as a parent process.

The defining of the access rights includes defining the protection level of the memory for each of the parent process and its respective child processes. The protection level of the child process may be defined by the parent process including, without limitation, the permitted memory resources with optional restrictions (for example, read only, even if the parent process is allowed to write to a particular memory region) or modifications (address translation). Further, the access rights of each of the parent processes and its respective child processes may be defined for an allocated memory address range.

However, the protection level defined by the parent process does not permit the child process any access rights which the parent process is itself not entitled to. For example, a parent process may be allowed to read a memory region M1 but it may not be allowed to write to the memory region M1. In this case, the parent process may permit the child process to either read the memory region M1 or read parts of the memory region M1. However, the parent process may not give the permission to the child process to write to the memory region M1.

Further, at step 206, the data structure is registered with the processor. In an embodiment of the present invention, the registering of the data structure is performed by executing one or more reserved instructions. Also, when a new child process is created, the parent process updates the registered data structure with the rights of the new child process. The parent process allocates a memory address range for the new child process and also defines the protection level of the new child process.

Once the data structure is registered, in an embodiment of the present invention, the parent process may communicate its own properties and its child process properties to the processor by using one or more reserved instructions. The reserved instruction may be a special instruction or existing load/store instructions using the registered memory region. Further, the parent process may continue its operation, for example, preparing other processes of the child, like loading instruction and data.

The processor (for example, extended page table walker) checks, whether the protection level defined in the data structure for the new child process is consistent with the access rights of the parent process. In an embodiment, the consistency is determined by checking for an exception at step 208. The exception checking determines whether the rights of the new child process are consistent with the rights of the parent process. For example, if the execution of a reserved instruction assigns the new child process the access rights over the use of a certain resource, the check determines whether the new child process, which executes the reserved instruction, has the access rights to use the resource itself in the specified way.

In one embodiment of the present invention, the exception may be checked in parallel with the execution of an instruction of the parent process. In case, if the new child process is started before the check is completed, the new child process is delayed until the check is done. Thereafter, a failed check is either signaled through an exception or through a failure mechanism when the new child process is started. The former approach may be handled by software as no exception handler is required. However, the former approach has lower performance. Since the checks are combined with instructions like child process call or store, there is a low impact on the processor micro-architecture, because these instructions can have a delay or exception generation associated with it. In an embodiment, only few (maybe one) checks can be active at a given point of time. Therefore, if a process tries to start too many checks before the previous ones are completed, the execution of the process is stalled. This is similar to page table walks on TLB misses in traditional processors.

In another embodiment of the present invention, in case the access rights are provided for writing in a memory region, it is ensured that the information in the memory region cannot be changed after the check has started. This can be achieved by making (implicitly or explicitly) the memory region read-only for the process for which the check has initiated, or by canceling the ongoing check whenever the information is changed.

Thereafter, if the access rights of the new child process are consistent, a validation result is stored in the parent process' data structure at step 210. However, in case there is an inconsistency in the access rights of the new child process, the processor returns the control to the parent process at step 212.

In another embodiment of the present invention, to facilitate fast protection checks and address translations, an additional data structure is built. The processor builds the additional data structure in the background when the parent or the child process is executed or after the data structure is registered or during validation of child/parent process rights. To build the additional data structure, the description of access rights of the current process as well as the processes deeper in the hierarchy is used. In an embodiment, several address translations may be merged into a single translation table. In an embodiment, if exception checking is performed using the additional data structure, then in case of inconsistency in the access rights of the child process, the additional data structure is freed. However, the current process does not have access to the information related to the additional data structure.

The data structure may comprise relative access rights of the parent processes and their respective child processes. These relative access rights are defined on the basis of the origin of an instruction from which the process is created and set up conditions on the access rights of the process including, the parent process or the child process.

More specifically, the access rights of a memory region are fixed for one application, for example, the application may be allowed to read data, write data, and/or execute instructions from a given memory region. However, in accordance with an embodiment of the present invention, the relative access rights may be set up depending upon the access rights of the process, for example, on the given memory region, write permission may be defined for a code from a very limited section of the whole program, all other sections may only read data from the given memory region. The relative rights of a process may also be determined on the basis of a value stored in a particular register i.e. a flag variable maybe set whose one or more states will determine the access rights of the processes originating at any particular point of time. Table 1 lists some of the examples of relative rights, as per the present invention.

a new second child process instruction. When a first child process instruction is executed at step 304, at least one new protection check on the address of the first child process instruction is performed at step 306. Optionally, the new protection check is performed on the data addresses by using either the protection level of the child process in the data structure or the additional data structure.

Optionally at step 308, the child process may return to the parent process by jumping to one of the registered return addresses. In an embodiment, a "return-from-subroutine" instruction may perform this operation, if the return address is included in the data structure. Thereafter, the parent process may call the same or other child process again and follow the process as described in step 302.

In an embodiment of the present invention, switching from the child process to the parent process may be detected. The return address is a set of addresses of the parent process included in the data structure that describes the rights of the child. The registration of the return addresses of the parent process is done as part of the construction of the data structure describing the child's rights. This data structure contains a list of return addresses into the parent process. Although the invention is described using this mechanism, a person skilled in the art will appreciate that other known mechanisms can be used for the registration of the addresses and fall within the spirit and scope of the present invention. When the processor reaches an instruction address which is not permitted for the current active process, it tests, whether this address is one of the permitted exit addresses for its parent process. When this test fails, an exception within the current process is generated.

However, if the child process is not needed, the processor deregisters the data structure of the child process. In an embodiment, if the child process has access rights only for read-only operation, the parent process may perform a write access to the data structure and deregister the data structure of the child process.

TABLE 1

| | Type of right to be checked | Type of condition | Example |
|---|---|---|---|
| 1 | Read access | Instruction origin | Enforcing data encapsulation by allowing only proper methods to read data objects in object oriented (OO)-programming |
| 2 | Write access | Instruction Origin | Enforcing OO - programming paradigm by restricting modification of an object to the related methods. Other code may also read the object. In a Just-In-Time compiler, restrict the generation of code to a limited, controllable section, protects from "arbitrary code execution" security holes. The region is executable. |
| 3 | Execution | Origin of instruction preceding the first instruction in this segment | Restrict the calling of a function to well-defined previous code segments, for example, restrict calling of low-level device functions from next-level device drivers. |
| 4 | R/W/E | Combination of instruction address and value requirement on one register | Inside a JVM allow only specific classes to do certain actions. All classes are handled by the same machine code (instruction address) but the class handled is identified by a certain register. |

Figure 3:
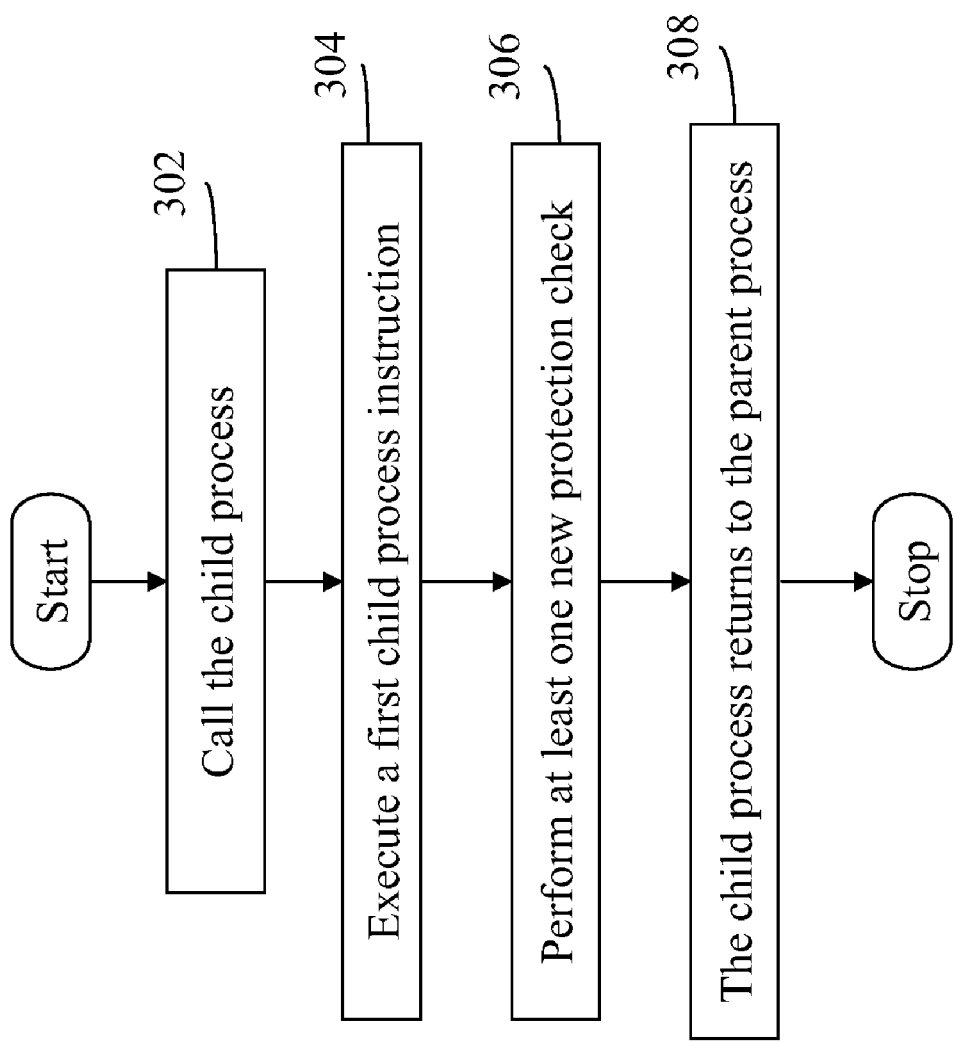
FIG. 3 illustrates the functioning of a parent process and its respective child process in accordance with an embodiment of the present invention.

FIG. 3 illustrates the functioning of the parent process and its respective child process in accordance with an embodiment of the present invention. At step 302, the parent process calls the child process and switches the memory protection level to the child process protection level prior to transferring the control to the child process. In an embodiment, the control is transferred atomically on instruction level, preferably with The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Figure 4:
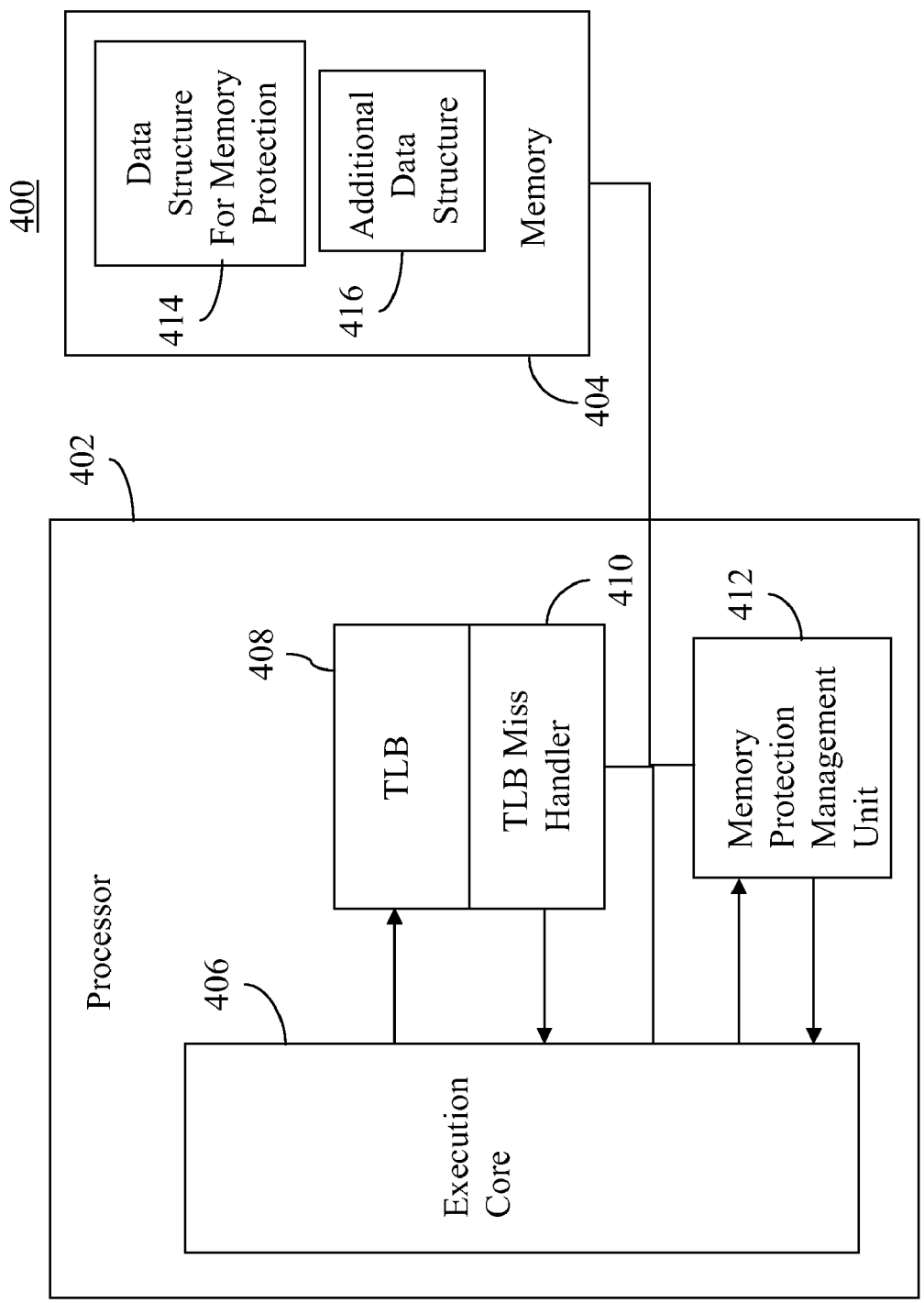
FIG. 4 shows a system implementing multi-level memory protection, in accordance with an embodiment of the present invention.

FIG. 4 shows a system 400 implementing multi-level memory protection, in accordance with an embodiment of the present invention. System 400 may be a data processing system suitable for storing and/or executing program instruction including at least one processor coupled directly or indirectly to memory through a system bus. The memory includes, but is not limited to, local memory employed during actual execution of the program instruction, bulk storage, and cache memories which provide temporary storage of at least some program instruction in order to reduce the number of times instruction must be retrieved from bulk storage during execution. Although the present invention is described using a single processor and a memory, a person skilled in the art will appreciate that various other elements like additional processors, additional memories, support circuits, network interfaces and displays may be connected to the system and fall within the spirit and scope of the present invention.

System 400 includes processor 402 linked to memory 404. Processor 402 includes an execution core 406 linked to a Translation Look-aside Buffer (TLB) 408 and a TLB Miss Handler 410. Further, processor 402 contains a memory protection management unit 412. The memory protection management unit 412 handles the reserved instructions and implements the validation of a child's rights with respect to the parent's rights. Memory 404 stores data structure 414 corresponding to the defined hierarchy of one or more parent processes and their respective child processes with access rights of each of the parent processes and their respective child processes. Memory 404 comprises an additional data structure 416 that stores the protection information describing the rights of processes. Processor 402 executes an instruction of the one or more parent processes and their respective child processes and performs at least one of registering and deregistering of the data structures.

In an embodiment, execution core 406 executes the instructions related to the parent process and its respective child process and exchanges the memory address for data or instruction fetch, the reserved instructions, fetch size, and access type with TLB 408. The reserved instruction may include registration of new protection level or initiating/killing of the child process. In an embodiment, the reserved instructions may build data structure 414 in a main memory or in a dedicated memory. In case data structure 414 is built in the main memory, the used address region may not be allowed to be written by normal processes. However, the used address region may be used by exceptions for example, a root process (may be the parent process) and/or specialized processes used for debugging or system management.

In another embodiment of the present invention, the access rights of a process (parent or child) may be written in the dedicated memory with only write access rights. In some cases, information may also be written along with other access rights for example, read access rights. The address of this memory location is communicated to processor 402, either when the child process is started or by storing it at a special address. The special address may be part of the information for the parent process.

In an embodiment of the present invention, a parent process may directly access a child process using data structure 414. TLB 408 is checked on every instruction read and every data or instruction read. TLB 408 is a cache which stores recently used addresses for a given process. When an address is not found in TLB 408 the memory protection data structures are searched. In a traditional system with only one level of address translation and/or protection information one tree or table structure optimized for this search has to be traversed.

If several levels of hierarchy each define an address translation, on a TLB miss, the TLB miss handler 410 has to evaluate an address translation from the current process's address view to the physical address. This involves interpreting all address translations deeper into the hierarchy, i.e. from the parent process to the parent's parent process and so on. This involves a considerable number of memory read operations to determine the corresponding process's protection and translation description data structure. This is not necessary for protection purposes, as the validation of the process rights on each entering a new level of process hierarchy has already ensured that the protection information of the current process is compliant with all the processes above in the hierarchy. However for address translation purposes, all the individual translation information is relevant. To reduce the computational effort on a TLB miss, a logical concatenation of the translation functions represented by the individual translation data structures can be precomputed and stored into the additional data structure 416. The additional data structure is not necessarily created for each level involving address translation. It can be created only for the cases where a frequent access is expected. Additional data structure 416 holds the validation results indicating the consistency of rights between the parent process and the child process. Therefore, additional data structure 416 allows fast address translations and protection checks by for example, merging several address translations into a single translation table.

TLB Miss Handler 410 exchanges error/success messages, physical address and hit of level return. TLB Miss Handler 410 invokes processor 402 for checking through the page table for the virtual address translation.

Figure 5:
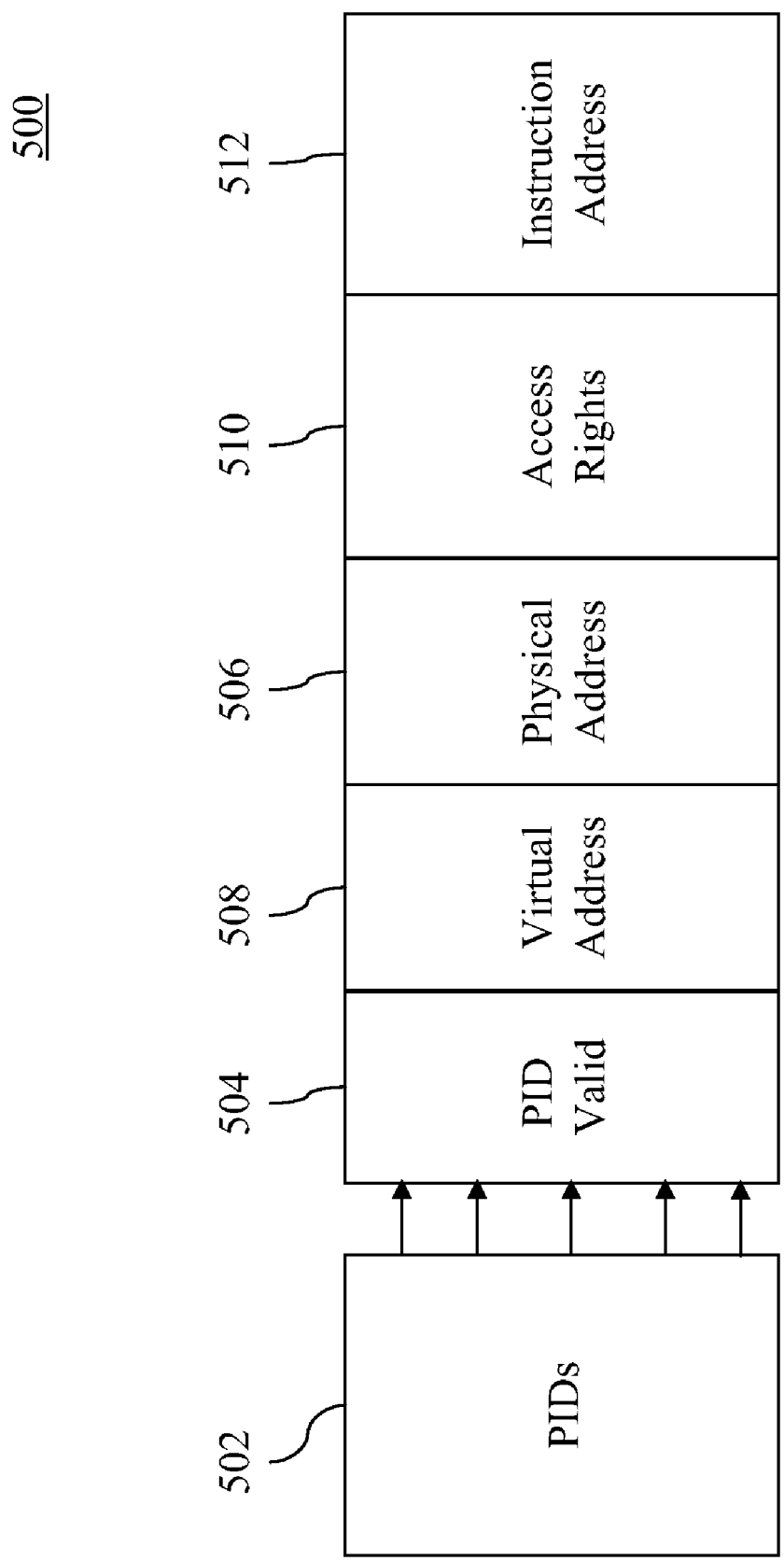
FIG. 5 shows a Translation Look-aside Buffer (TLB) for implementing multi-level memory protection, in accordance with an embodiment of the present invention.

FIG. 5 illustrates a Translation Look-aside Buffer (TLB) 500 for implementing the multi-level memory protection, in accordance with an embodiment of the present invention. Conventionally, a TLB is used by the processor that contains parts of page table which translates virtual address to real address (or physical address). The TLB combines the current Process ID (PID), the translation and the protection information to allow fast check of memory access. Concurrent existence of entries with different process identifiers is possible in the TLB. However, there is a high redundancy between entries for same memory region for different levels in the process hierarchy. The buffer is typically a content addressable memory (CAM) in which the search key is the virtual address and the search result is a real or physical address. If the CAM search yields a match, the translation is known and the match data are used. If no match exists, the translation proceeds via the page table, which may take several more cycles to complete, particularly, if the translation tables are swapped out into secondary storage.

In accordance with the present invention, TLB 500 includes a Process Identifier (PID) hash table 502 identifying a PID valid table 504. In an embodiment, PID hash table 502 is a fully associative CAM. In accordance with other embodiment, PID hash table 502 may use a multi-cycle lookup structure, such as a hash table. PID valid table 504 includes a valid PID entry for only those child processes which have rights consistent with the parent process. The search time on this structure determines latency from a process identifier change to a first memory access instruction. TLB 500 is used in a virtual memory system that lists physical address page number 506 associated with each virtual address page number 508. TLB 500 is used in conjunction with a cache whose tags are based on virtual addresses. The virtual address is presented simultaneously to TLB 500 and to the cache so that cache access and the virtual-to-physical address translation can proceed in parallel. If the requested address is not cached then the physical address is used to locate the data in the memory. The alternative would be to place the translation table between the cache and the memory so that it will only be activated once there was a cache miss. TLB 500 also stores access rights 510 of the processes. In another embodiment of the present invention, the TLB 500 includes instruction address 512 which may be the special instructions.

In an embodiment of the present invention, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. In particular examples, the medium can be a computer-useable storage medium which includes a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and DVD.

The computer usable medium is provided herein includes a computer usable program code for providing multi-level memory protection. The computer usable medium includes a computer usable program code for defining a hierarchy of one or more parent processes and their respective child processes and a computer usable program code for building a data structure for defining rights of each of the parent processes and their respective child processes in the defined hierarchy. Further, the present invention includes a computer usable program code for registering the data structure upon execution of one or more reserved instructions and a computer usable program code for building an additional data structure of relative rights of the parent processes and their respective child processes. The present invention also includes a computer usable program code for checking for an exception upon creation of a new child process.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A method for providing multi-level memory protection, the method comprising:
   defining a hierarchy of one or more parent processes and their respective child processes, wherein at least one of the child processes is a parent process when the at least one child process includes one or more sub-processes;
   building a data structure defining access rights of each of the parent processes and their respective child processes in the defined hierarchy, the defining of the access rights including defining permitted memory resources of each respective child process and the access rights of the child process relative to the access rights of the parent process of such child process, the data structure further containing a precomputed logical concatenation of translation functions represented by a plurality of individual translation data structures corresponding to processes at respective levels of the defined hierarchy, for performing address translation from the address view of a process of the processes therein to a physical address;
   registering the data structure with a processor; and
   using the data structure for memory protection and to perform address translation, such that each child process has access rights to the memory resources only as permitted in accordance with the data structure, so as to translate between an address view of a current process to the corresponding physical address in accordance with the precomputed logical concatenation of translation functions contained in the data structure.

2. The method of claim 1, wherein the data structure defines relative access rights on the basis of an origin of an instruction from which a process of the one or more parent processes and their respective child processes is created.

3. The method of claim 1, wherein the data structure defines relative access rights on the basis of the value of a variable in a particular register of a computing environment to which the processor belongs.

4. The method of claim 1, wherein registering the data structure is performed upon execution of one or more reserved instructions.

5. The method of claim 1, wherein, in response to a new child process being created, the registered data structure is updated with the access rights of the new child process by the parent process.

6. The method of claim 1, further comprising the processor deregistering the data structure of the child process when the child process does not require the access rights defined by the data structure.

7. The method of claim 1, further comprising checking for an exception upon creation of a new child process.

8. The method of claim 7, wherein the checking is performed in parallel to the execution of an instruction of the parent process.

9. The method of claim 7, wherein the checking comprises:
   determining if the access rights of the new child process are consistent with the access rights of the parent process, and storing a validation result in the data structure subsequent to the successful determination.

10. The method of claim 9, further comprising a processor returning control to the parent process upon unsuccessful determination.

11. The method of claim 1, wherein the data structure is a first data structure, the method further comprising building an additional data structure defining relative access rights of the parent processes and their respective child processes, the step of building the additional data structure performed at least one of: in the background when the parent or the child process is executed; after the data structure is registered; or during validation of child/parent process rights.

12. The method of claim 1, wherein building the data structure comprises allocating a memory address range to each parent process and its respective child processes.

13. The method of claim 1, wherein the data structure further comprises memory address range for each of the child process to return to their respective parent processes.

14. The method of claim 1, wherein defining the access rights includes defining a protection level of the memory for each parent process and its respective child processes.

15. The method of claim 14, wherein defining the access rights includes defining the rights of each parent process and its respective child processes within an allocated memory address range.

16. The method of claim 14, wherein the memory protection level is switched to the protection level of the child process, the method further comprising thereafter transferring control to the child process.

17. A system for providing multi-level memory protection, the system comprising:
- a memory storing a data structure defining access rights of each of one or more parent processes and their respective child processes of a defined hierarchy of the one or more parent processes and the child processes, the defining of the access rights including defining permitted memory resources of each respective child process and the access rights of the child process relative to the access rights of the parent process of such child process, wherein at least one of the child processes is a parent process when the at least one child process includes one or more sub-processes, the data structure further containing a precomputed logical concatenation of translation functions represented by a plurality of individual translation data structures corresponding to processes at respective levels of the defined hierarchy, for performing address translation from the address view of a process of the processes therein to a physical address; and
- a processor connected to the memory for executing a instruction of the one or more parent processes and their respective child processes, the processor configured to perform at least one of registering and deregistering of the data structure and to use the data structure for memory protection and to perform address translation, such that each child process has access rights to the memory resources only as permitted in accordance with the data structure, and so as to translate between an address view of a current process to the corresponding physical address in accordance with the precomputed logical concatenation of translation functions contained in the data structure.

18. A computer program product comprising a computer useable storage medium, wherein said computer useable storage medium is not a propagating signal, including a computer usable program code executable by a processor to perform a method of providing multi-level memory protection, the method comprising:
- defining a hierarchy of one or more parent processes and their respective child processes: wherein at least one of the child processes is a parent process when the at least one child process includes one or more sub-processes;
- building a data structure defining access rights of each of the parent processes and their respective child processes in the defined hierarchy, the defining of the access rights including defining permitted memory resources of each respective child process and the access rights of the child process relative to the access rights of the parent process of such child process, the data structure further containing a precomputed logical concatenation of translation functions represented by a plurality of individual translation data structures corresponding to processes at respective levels of the defined hierarchy, for performing address translation from the address
- view of a process of the processes therein to a physical address: ang registering the data structure with a processor; and using the data structure for memory protection and to perform address translation, such that each child process has access rights to the memory resources only as permitted in accordance with the data structure, so as to translate between an address view of a current process to the corresponding physical address in accordance with the precomputed logical concatenation of translation functions contained in the data structure.

19. The computer program product of claim 18, wherein the step of registering the data structure with a processor is performed upon execution of one or more reserved instructions.

20. The computer program product of claim 18, wherein the method further comprises building an additional data structure of relative access rights of the parent processes and their respective child processes.

21. The computer program product of claim 18, wherein the method further comprises checking for an exception upon creation of a new child process.

* * * * *